(12) United States Patent
Zhang (10) Patent No.: US 11,563,837 B2
(45) Date of Patent: Jan. 24, 2023

(54) MOBILE TERMINAL (71) Applicant: WUHAN CHINA STAR OPTOELECTRONICS TECHNOLOGY CO., LTD., Hubei (CN)

(72) Inventor: Wei Zhang, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 592 days.

(21) Appl. No.: 16/346,204

(22) PCT Filed: Dec. 27, 2018

(86) PCT No.: PCT/CN2018/124449
§ 371 (c)(1),
(2) Date: Apr. 30, 2019

(87) PCT Pub. No.: WO2020/103287
PCT Pub. Date: May 28, 2020

(65) Prior Publication Data
US 2021/0337052 A1    Oct. 28, 2021

(30) Foreign Application Priority Data
Nov. 23, 2018  (CN) .......................... 201811402974.7

(51) Int. Cl.
*H04M 1/02* (2006.01)

(52) U.S. Cl.
CPC ................................ *H04M 1/0266* (2013.01)

(58) Field of Classification Search
CPC ............ H04M 1/0266; G02F 1/133308; G02F 2201/465; G02F 1/1333; G02F 1/13332;
(Continued)

(56) References Cited

U.S. PATENT DOCUMENTS

2007/0002206 A1* 1/2007 Shirai ............... G02F 1/133308
349/58
2015/0055316 A1* 2/2015 Ye ....................... G02F 1/13452
29/825
(Continued)

FOREIGN PATENT DOCUMENTS

CN         101169564 A      4/2008
CN         104360541 A      2/2015
(Continued)

*Primary Examiner* — Lester G Kincaid
*Assistant Examiner* — Maryam Soltanzadeh
(74) *Attorney, Agent, or Firm* — PV IP PC; Wei Te Chung; Ude Lu (57) ABSTRACT

A mobile terminal includes a middle frame, a fixing frame, and a cover plate. The middle frame includes a first placement slot and a second placement slot. The fixing frame is disposed in the second placement slot. The cover plate is disposed in the first placement slot. The second placement slot includes first side surfaces. The first side surfaces are provided with a plurality of first protrusions. The fixing frame includes first sidewalls. The first sidewalls are provided with a plurality of second protrusions. The first protrusions and the second protrusions are arranged to form a support structure configured to support the cover plate, and the cover plate is fixedly connected to the support structure.

18 Claims, 5 Drawing Sheets

(58) Field of Classification Search
CPC ......... G02F 1/133314; G02F 1/133322; G02F 1/13452; G02F 1/133317; G02F 1/133512; G02F 2202/28; G02F 1/133615; G02F 1/133607; G02F 1/133608; G02F 1/133606; G06F 1/1656; G06F 1/1637; H05K 5/0017; H05K 13/00; H05K 5/02; H05K 7/1422; F16M 13/02; F16B 2001/0092; G02B 7/00; G02B 6/0088; G02B 6/009; G02B 6/0036; G02B 6/0065; G02B 6/0055; G02B 6/0035; G02B 6/0093; Y10T 29/49117

See application file for complete search history.

(56) References Cited

U.S. PATENT DOCUMENTS

| | | | |
|---|---|---|---|
| 2015/0201763 A1* | 7/2015 | Choi | G09F 13/0413 40/716 |
| 2016/0327733 A1 | 11/2016 | Liu et al. | |
| 2018/0224594 A1 | 8/2018 | Wu | |
| 2019/0204661 A1* | 7/2019 | Moon | H05K 5/0017 |

FOREIGN PATENT DOCUMENTS

| | | |
|---|---|---|
| CN | 104456426 A | 3/2015 |
| CN | 204213750 U | 3/2015 |
| CN | 105785498 A | 7/2016 |
| KR | 20060015910 A | 2/2006 |

* cited by examiner

MOBILE TERMINAL

FIELD OF INVENTION

The present disclosure relates to the field of display technologies, and more particularly to a mobile terminal.

BACKGROUND OF INVENTION

Figure 1:
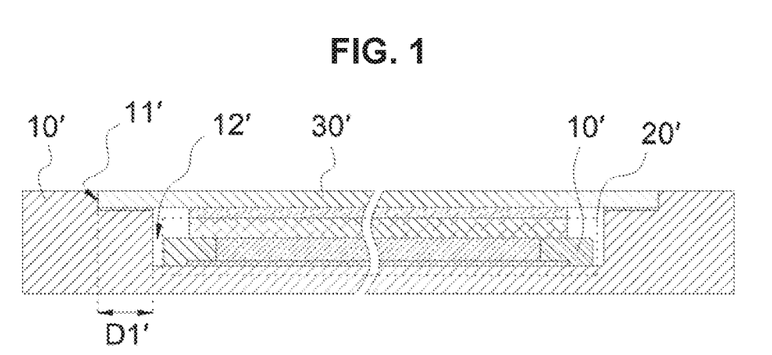
FIG. 1 is a schematic structural diagram of a current mobile phone.
Figure 2:
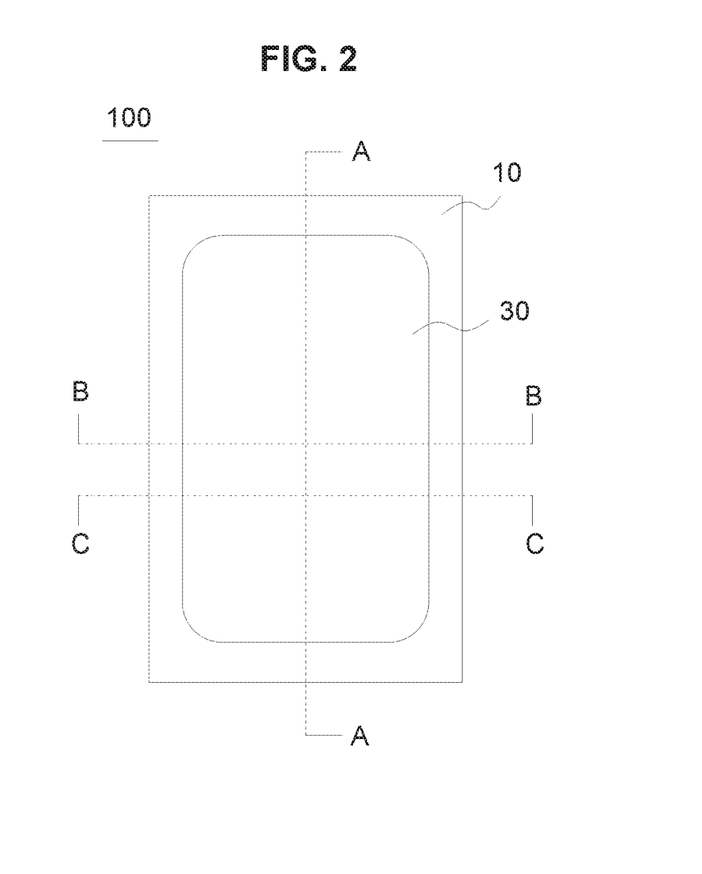
FIG. 2 is a schematic top plan view of a mobile terminal according to an embodiment of the present disclosure.
Figure 3:
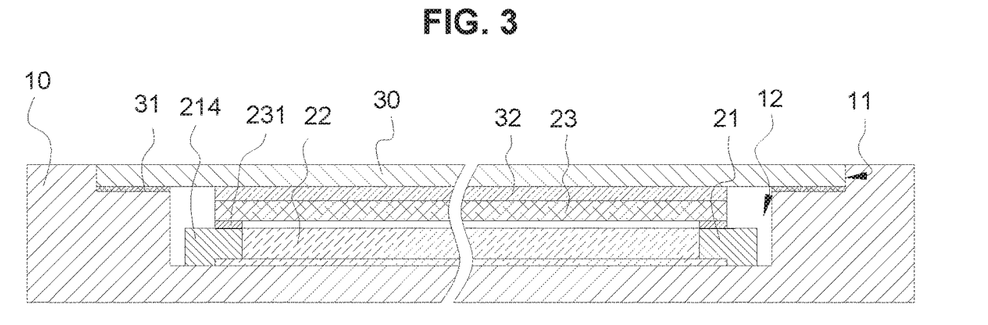
FIG. 3 is a schematic cross-sectional view taken along line AA of FIG. 2.
Figure 4:
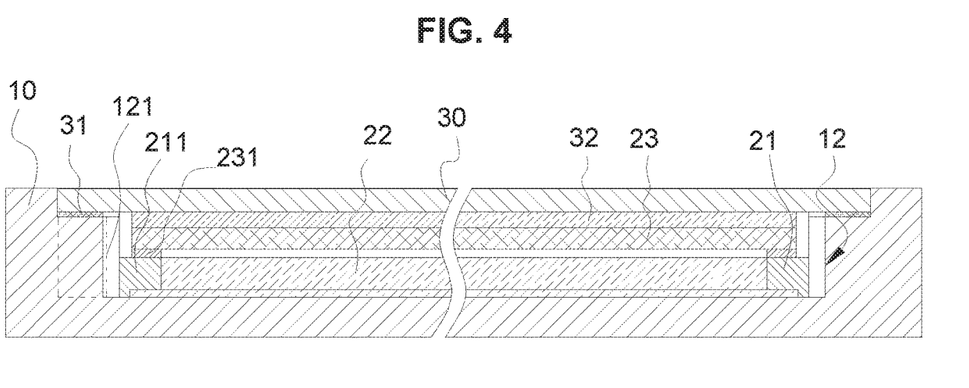
FIG. 4 is a schematic cross-sectional view taken along line BB of FIG. 2.
Figure 5:
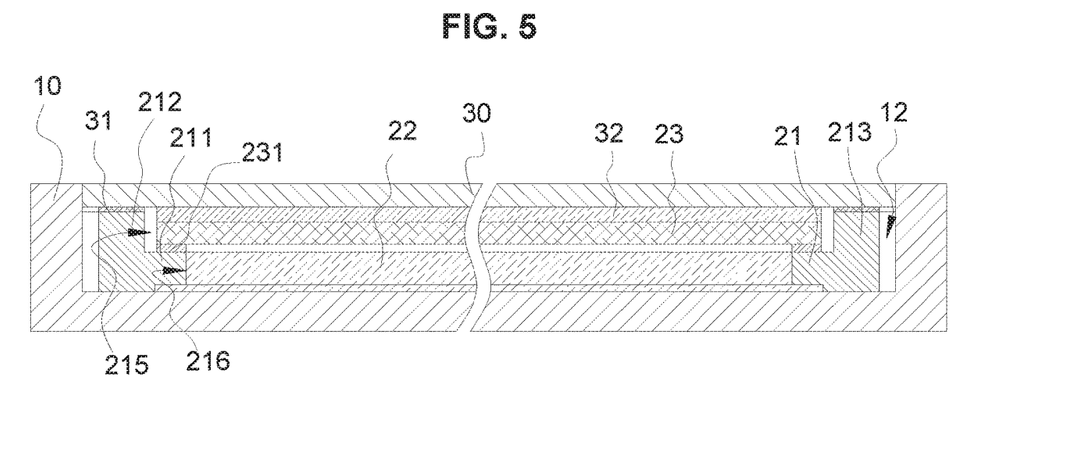
FIG. 5 is a schematic cross-sectional view taken along line CC of FIG. 2.

In current mobile phones, as illustrated in FIG. 1, a mobile phone includes a middle frame 10', a display module 20', and a glass cover 30'. An inner edge of the middle frame 10' is provided with a step. The lower portion of the step is closed to form a first placement slot 12'. The upper portion of the step is closed to form a second placement groove 11'. The first placement slot 12' is in communication with the second placement slot 11'. The display module 20' is disposed in the first placement slot 12'. There is a gap between the display module 20' and the lower portion of the step, and a width of the gap is 0.3 mm. The glass cover 30' is disposed in the second placement slot 11', and an overlapping width D1' of the glass cover 30' and the step ranges between 0.6 mm and 0.8 mm or more. Therefore, a distance from the display module 20' to an inner wall of the second placement slot 11' of the middle frame 10' ranges between 0.9 mm and 1.1 mm.

As a result, a screen ratio of the mobile phone cannot be increased.

SUMMARY OF INVENTION

An embodiment of the present disclosure provides a mobile terminal to solve the technical problem that current mobile phones have a relatively small screen ratio.

An embodiment of the present disclosure provides a mobile terminal. The mobile terminal includes a middle frame, a display module, and a cover plate. The middle frame includes a first placement slot and a second placement slot. The first placement slot includes an intermediate area and two end areas positioned at two ends of the intermediate area, the second placement slot is positioned below the intermediate area and communicates with the intermediate area, a peripheral edge of the intermediate area and a peripheral edge of the second placement slot are coincident. The display module is disposed in the second placement slot. The cover plate is disposed in the first placement slot. The display module includes a fixing frame, a backlight module, and a display panel, and the backlight module and the display panel are both disposed in the fixing frame. The second placement slot includes opposite first side surfaces, an extending direction of the first side surface is perpendicular to an extending direction of the two end areas, the first side surfaces are provided with a plurality of first protrusions, the first protrusions positioned on a same first side surface are spaced apart, a plurality of first grooves are defined between the first protrusions positioned on the same first side surface, the fixing frame includes opposite first sidewalls, the first sidewalls facing a side of the first side surface are provided with a plurality of second protrusions, the second protrusions positioned on a same first sidewall are spaced apart, and a plurality of second grooves are defined between the second protrusions positioned on the same first sidewall. The first protrusions are disposed in the second grooves in a one-to-one correspondence, the second protrusions are disposed in the first grooves in a one-to-one correspondence, the first protrusions and the second protrusions are alternately arranged to form a support structure configured to support the cover plate, and two sides of the cover plate are fixedly connected to the support structure. The first protrusion includes a first surface, the second protrusion includes a second surface, the first surface and the second surface both face the cover plate, and bottom surfaces of the two end areas, the first surface, and the second surface are flush. A length of the first protrusion is greater than a length of the second protrusion.

In an embodiment of the present disclosure, the first surface, the second surface, and the bottom surfaces of the two end areas define a connecting surface, and a peripheral edge portion of the cover plate is fixedly connected to the connecting surface by a foam adhesive.

In an embodiment of the present disclosure, a width of the first protrusion ranges between 0.4 mm and 0.5 mm.

In an embodiment of the present disclosure, the first protrusions positioned between two first side surfaces are oppositely disposed, and the second protrusions positioned between two first sidewalls face away from each other.

In an embodiment of the present disclosure, the fixing frame further includes opposite second sidewalls, an extending direction of the second sidewall is parallel to an extending direction of the two end areas, the second sidewall is positioned equal to the first sidewall, and the first sidewall is positioned lower than the second protrusion.

In an embodiment of the present disclosure, a portion of the second protrusion positioned higher than the first sidewall defines a first fixing slot, the first sidewall and the second sidewall are encircled to define a second fixing slot, the backlight module is disposed in the second fixing slot, and the display panel is disposed in the first fixing slot.

In an embodiment of the present disclosure, the display panel is fixedly connected to top surfaces of the first sidewall and the second sidewall by a black adhesive.

In an embodiment of the present disclosure, the cover plate and the display panel are fixedly connected by an optical adhesive.

An embodiment of the present disclosure further provides a mobile terminal. The mobile terminal includes a middle frame, a display module, and a cover plate. The middle frame includes a first placement slot and a second placement slot. The first placement slot includes an intermediate area and two end areas positioned at two ends of the intermediate area, the second placement slot is positioned below the intermediate area and communicates with the intermediate area, a peripheral edge of the intermediate area and a peripheral edge of the second placement slot are coincident. The display module is disposed in the second placement slot. The cover plate is disposed in the first placement slot. The display module includes a fixing frame, a backlight module, and a display panel, and the backlight module and the display panel are both disposed in the fixing frame. The second placement slot includes opposite first side surfaces, an extending direction of the first side surface is perpendicular to an extending direction of the two end areas, the first side surfaces are provided with a plurality of first protrusions, the first protrusions positioned on a same first side surface are spaced apart, a plurality of first grooves are defined between the first protrusions positioned on the same first side surface, the fixing frame includes opposite first sidewalls, the first sidewalls facing a side of the first side surface are provided with a plurality of second protrusions, the second protrusions positioned on a same first sidewall are spaced apart, and a plurality of second grooves are defined between the second protrusions positioned on the same first sidewall. The first protrusions are disposed in the second grooves in a one-to-one correspondence, the second protrusions are disposed in the first grooves in a one-to-one correspondence, the first protrusions and the second protrusions are alternately arranged to form a support structure configured to support the cover plate, and two sides of the cover plate are fixedly connected to the support structure.

In an embodiment of the present disclosure, the first protrusion includes a first surface, the second protrusion includes a second surface, the first surface and the second surface both face the cover plate, and bottom surfaces of the two end areas, the first surface, and the second surface are flush.

In an embodiment of the present disclosure, the first surface, the second surface, and the bottom surfaces of the two end areas define a connecting surface, and a peripheral edge portion of the cover plate is fixedly connected to the connecting surface by a foam adhesive.

In an embodiment of the present disclosure, a width of the first protrusion ranges between 0.4 mm and 0.5 mm.

In an embodiment of the present disclosure, a length of the first protrusion is greater than a length of the second protrusion.

In an embodiment of the present disclosure, the first protrusions positioned between two first side surfaces are oppositely disposed, and the second protrusions positioned between two first sidewalls face away from each other.

In an embodiment of the present disclosure, the fixing frame further includes opposite second sidewalls, an extending direction of the second sidewall is parallel to an extending direction of the two end areas, the second sidewall is positioned equal to the first sidewall, and the first sidewall is positioned lower than the second protrusion.

In an embodiment of the present disclosure, a portion of the second protrusion positioned higher than the first sidewall defines a first fixing slot, the first sidewall and the second sidewall are encircled to define a second fixing slot, the backlight module is disposed in the second fixing slot, and the display panel is disposed in the first fixing slot.

In an embodiment of the present disclosure, the display panel is fixedly connected to top surfaces of the first sidewall and the second sidewall by a black adhesive.

In an embodiment of the present disclosure, the cover plate and the display panel are fixedly connected by an optical adhesive.

Compared with the mobile terminal of the prior art, the mobile terminal of the embodiment of the present disclosure replaces a connection design of the steps on two sides of the cover plate and the middle frame in the prior art by fixedly connecting the first surface of the first protrusion and the second surface of the second protrusion to two side edges of the cover plate. This improves a screen ratio of the mobile terminal and solves the technical problem that current mobile phones have a relatively small screen ratio.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF PREFERRED EMBODIMENTS

In the drawings, same component is labeled with same reference number. The following description is based on the specific embodiments of the present disclosure as illustrated, and it should not be construed as limiting other specific embodiments that are not described herein.

Referring to FIG. 2 to FIG. 6, a mobile terminal 100 of an embodiment of the present disclosure includes a middle frame 10, a display module 20, and a cover plate 30.

The middle frame 10 includes a first placement slot 11 and a second placement slot 12. The first placement slot 11 includes an intermediate area 111 and two end areas 112 positioned at two ends of the intermediate area 111. The second placement slot 12 is positioned below the intermediate area 111 and communicates with the intermediate area 111. A peripheral edge of the intermediate area 111 and a peripheral edge of the second placement slot 12 are coincident. The display module 20 is disposed in the second placement slot 12. The cover plate 30 is disposed in the first placement slot 11.

The display module 20 includes a fixing frame 21, a backlight module 22, and a display panel 23. The backlight module 22 and the display panel 23 are both disposed in the fixing frame 21.

Figure 9:
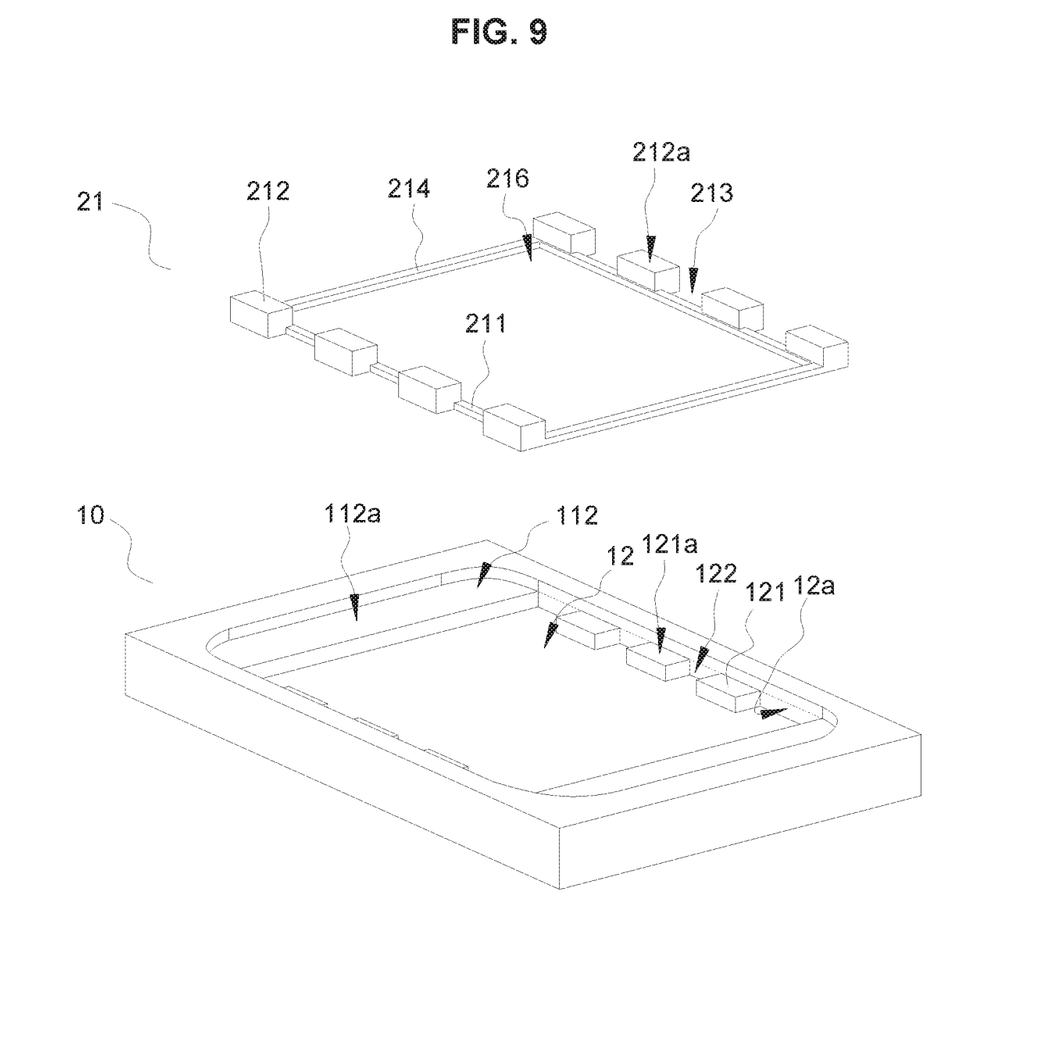
FIG. 9 is a schematic structural diagram of a middle frame and a fixing frame of a mobile terminal according to an embodiment of the present disclosure.

The second placement slot 12 includes opposite first side surfaces 12a (as illustrated in FIG. 9). An extending direction of the first side surface 12a is perpendicular to an extending direction of the two end areas 112. The first side surfaces 12a are provided with a plurality of first protrusions 121. The first protrusions 121 positioned on a same first side surface 12a are spaced apart. A plurality of first grooves 122 are defined between the first protrusions 121 positioned on the same first side surface 12a. The fixing frame 21 includes opposite first sidewalls 211. The first sidewalls 211 facing a side of the first side surface 12a are provided with a plurality of second protrusions 212. The second protrusions 212 positioned on a same first sidewall 211 are spaced apart. A plurality of second grooves 213 are defined between the second protrusions 212 positioned on the same first sidewall 211.

The first protrusions 121 are disposed in the second grooves 213 in a one-to-one correspondence. The second protrusions 212 are disposed in the first grooves 122 in a one-to-one correspondence. The first protrusions 121 and the second protrusions 212 are alternately arranged to form a support structure configured to support the cover plate 30, and two sides of the cover plate 30 are fixedly connected to the support structure.

The mobile terminal 100 of the embodiment replaces a connection design of the steps on two sides of the cover plate and the middle frame in the prior art by fixedly connecting the first protrusion 121 and the second protrusion 212 to two side edges of the cover plate 30. This improves a screen ratio of the mobile terminal 100.

In the embodiment, the intermediate area 111 of the first placement slot 11 is entirely recessed downward, and the recessed portion thereof forms the second placement slot 12. Therefore, the steps on both sides of the middle frame in the prior art are eliminated, and the two side edges of the cover plate have no supporting objects due to the elimination of both sides of the steps. Therefore, the second protrusion 212 of the outer wall surface of the first sidewall 211 of the fixing frame 21 and the first protrusion 121 of the inner wall surface of the second placement slot 12 are combined to form a supporting structure for supporting and bonding both side edges of the cover plate 30.

In details, a width of each of the steps on both sides of the middle frame in the prior art ranges between 6 mm and 8 mm, and widths of the first protrusion 121 and the second protrusion 221 in the embodiment range between 0.4 mm and 0.5 mm. The first protrusion 121 and the second protrusion 221 are alternately engaged. Therefore, at least a width of the display panel 23 can be increased by 1 mm or more, thereby increasing a screen ratio of the embodiment. It is understood that, in practice, the widths of the first protrusion 121 and the second protrusion 221 can be adjusted according to actual conditions.

In addition, the support structure formed by the alternate arrangement of the first protrusion 121 and the second protrusion 221 improves a strength of the support structure, and the first protrusion 121 and the middle frame 10 are integrally formed and have same material. The second protrusion 212 and the fixing frame 21 are integrally formed and have same material. A rigidity of the first protrusion 121 is greater than a rigidity of the second protrusion 212. In the embodiment, the fixing frame 21 is a plastic frame.

Figure 6:
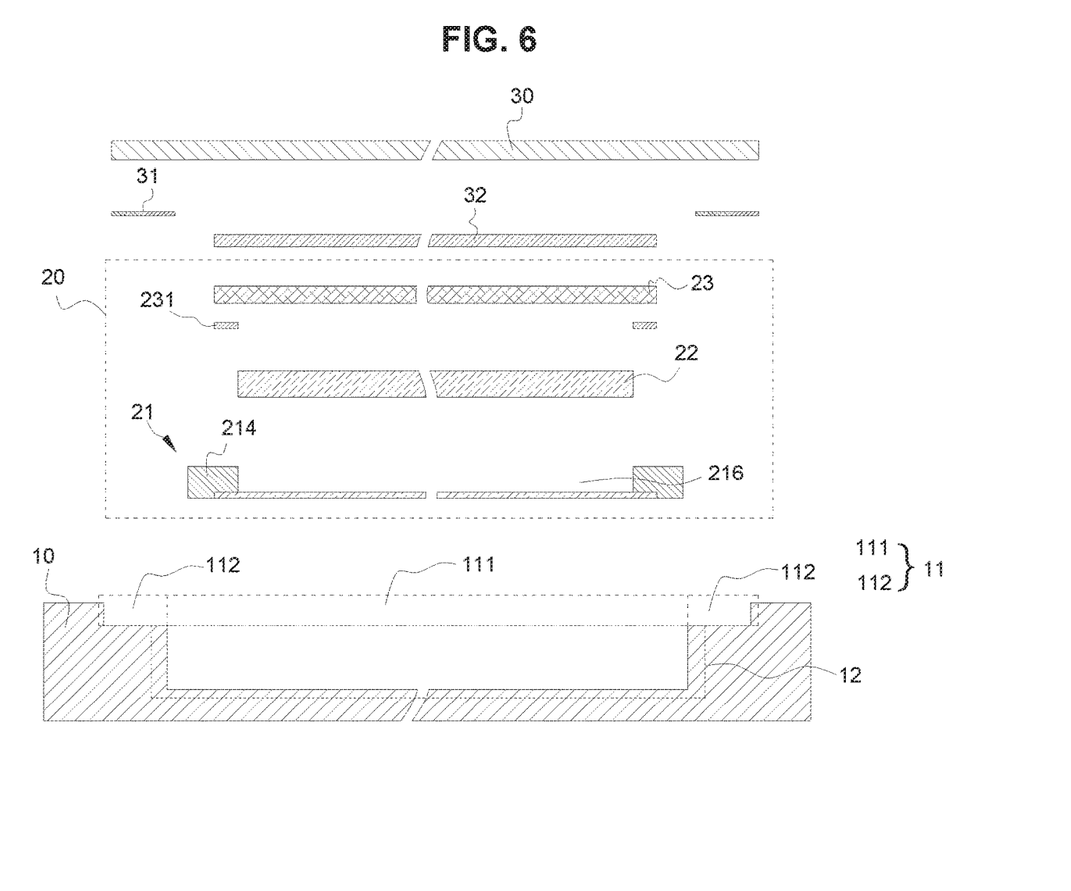
FIG. 6 is a structural explosion diagram of FIG. 3.
Figure 7:
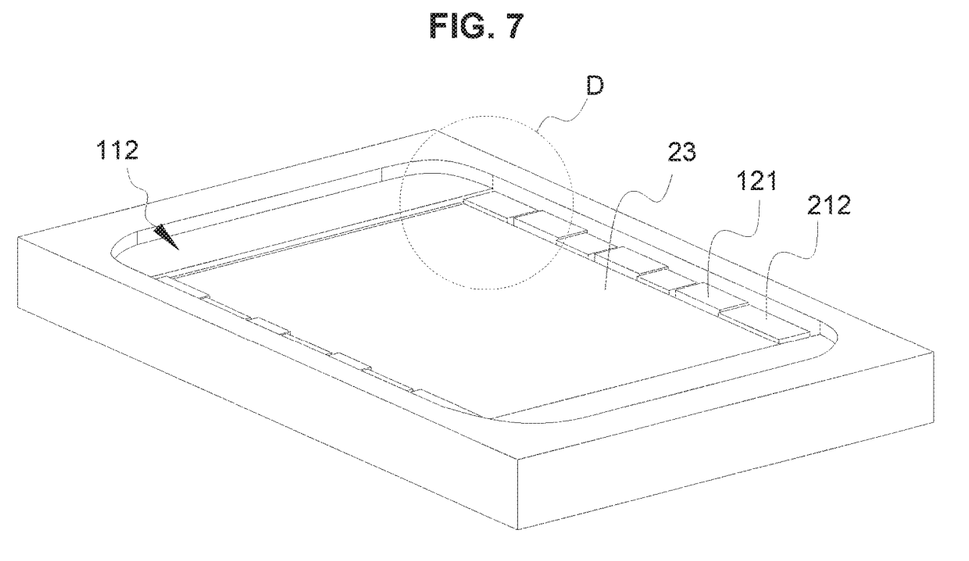
FIG. 7 is a schematic structural diagram of a mobile terminal removing a cover plate according to an embodiment of the present disclosure.

Referring to FIG. 6, FIG. 7, and FIG. 9. In the embodiment, the first protrusion 121 includes a first surface 121a, the second protrusion 212 includes a second surface 212a. The first surface 121a and the second surface 212a both face the cover plate 30. Bottom surfaces 112a of the two end areas 112, the first surface 121a, and the second surface 212a are flush. Such an arrangement prevents an unevenness of the cover plate 30 when the cover plate 30 is connected to the first surface 121a, the second surface 212a, and the bottom surfaces 112a.

In the embodiment, the first surface 121a, the second surface 212a, and the bottom surfaces 112a of the two end areas 112 define a connecting surface, and a peripheral edge portion of the cover plate 30 is fixedly connected to the connecting surface by a foam adhesive. Because the first surface 121a, the second surface 212a, and the bottom surfaces 112a are flush planes, fitting of the cover plate 30 and the connecting surface is facilitated, and a flatness of the cover plate 30 is improved.

In the embodiment, a length of the first protrusion 121 is greater than a length of the second protrusion 212. Because the rigidity of the first protrusion 121 is greater than the rigidity of the second protrusion 212, such an arrangement improves a rigidity of the support structure formed by the first protrusion 121 and the second protrusion 212, thereby improving stability of the support cover 30.

In the embodiment, the first protrusions 121 positioned between two first side surfaces 12a are oppositely disposed, and the second protrusions 212 positioned between two first sidewalls 211 face away from each other. Such an arrangement enables the two sides of the cover plate 30 to receive a same supporting force, which improves a stability of the fixed connection of the cover plate 30 and the support structure and avoids uneven support forces on both sides.

Figure 8:
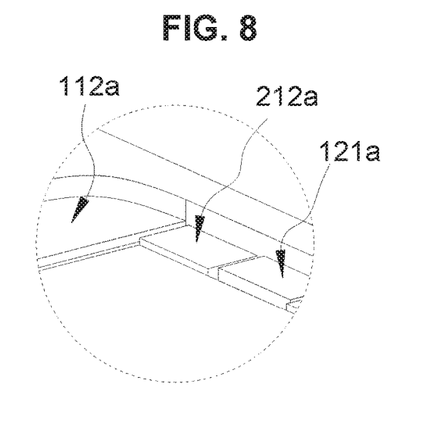
FIG. 8 is an enlarged view of D in FIG. 7.

Referring to FIG. 8 and FIG. 9, in the embodiment, the fixing frame 21 further includes opposite second sidewalls 214. An extending direction of the second sidewall 214 is parallel to an extending direction of the two end areas 112. The second sidewall 214 is positioned equal to the first sidewall 211. The first sidewall 211 is positioned lower than the second protrusion 212. Because the first sidewall 211 is positioned lower than the second protrusion 212, material can be saved, and the cost can be further saved.

In the embodiment, a portion of the second protrusion 212 positioned higher than the first sidewall 211 defines a first fixing slot 215. The first sidewall 211 and the second sidewall 214 are encircled to define a second fixing slot 216. The backlight module 22 is disposed in the second fixing slot 216. The display panel 23 is disposed in the first fixing slot 215. The display panel 23 is fixedly connected to top surfaces of the first sidewall 211 and the second sidewall 214.

In the embodiment, the display panel 23 is fixedly connected to top surfaces of the first sidewall 211 and the second sidewall 214 by a black adhesive. The black adhesive 231 is a black shading glue to prevent the display module 20 from leaking light.

In the embodiment, the cover plate 30 and the display panel 23 are fixedly connected by an optical adhesive 32.

The assembly process of the embodiment is as follows.

First, a portion of the second protrusion 212 positioned higher than the first sidewall 211 defines a first fixing slot 215. The first sidewall 211 and the second sidewall 214 are encircled to define a second fixing slot 216. The backlight module 22 is placed in the second fixing slot 216. The display panel 23 is placed in the first fixing slot 215. The display panel 23 is fixedly connected to top surfaces of the first sidewall 211 and the second sidewall 214 to form a display module 20.

Then, the display module 20 is placed and fixed in the second placement slot 12 of the middle frame 10. The first protrusions 121 are disposed in the second grooves 213 in a one-to-one correspondence and the second protrusions 212 are disposed in the first grooves 122 in a one-to-one correspondence, such that the first protrusions 121 and the second protrusions 212 form a support structure configured to support the cover plate 30, and the first surface 121a, the second surface 212a, and the bottom surfaces 112a of the two end areas 112 define a connecting surface.

Finally, the cover plate 30 is placed in the first placement slot 11 and attached to the foam adhesive 31 to securely attach the cover plate 30 to the connection surface.

This completes the assembly process of the embodiment.

Compared with the mobile terminal of the prior art, the mobile terminal of the embodiment of the present disclosure replaces a connection design of the steps on two sides of the cover plate and the middle frame in the prior art by fixedly connecting the first surface of the first protrusion and the second surface of the second protrusion to two side edges of the cover plate. This improves a screen ratio of the mobile terminal and solves the technical problem that current mobile phones have a relatively small screen ratio.

In summary, various changes and modifications can be made in accordance with the technical solutions and technical concepts of the present disclosure, and these changes and modifications should be encompassed within the protection scope of the present disclosure.

What is claimed is:

1. A mobile terminal, comprising:
a middle frame comprising a first placement slot and a second placement slot, wherein the first placement slot comprises an intermediate area and two end areas positioned at two ends of the intermediate area, the second placement slot is positioned below the intermediate area and communicates with the intermediate area, a peripheral edge of the intermediate area and a peripheral edge of the second placement slot are coincident;
a display module disposed in the second placement slot; and
a cover plate disposed in the first placement slot;
wherein the display module comprises a fixing frame, a backlight module, and a display panel, and the backlight module and the display panel are both disposed in the fixing frame;
wherein the second placement slot comprises opposite first side surfaces, an extending direction of the first side surface is perpendicular to an extending direction of the two end areas, the first side surfaces are provided with a plurality of first protrusions, the first protrusions positioned on a same first side surface are spaced apart, a plurality of first grooves are defined between the first protrusions positioned on the same first side surface, the fixing frame comprises opposite first sidewalls, the first sidewalls facing a side of the first side surface are provided with a plurality of second protrusions, the second protrusions positioned on a same first sidewall are spaced apart, and a plurality of second grooves are defined between the second protrusions positioned on the same first sidewall;
wherein the first protrusions are disposed in the second grooves in a one-to-one correspondence, the second protrusions are disposed in the first grooves in a one-to-one correspondence, the first protrusions and the second protrusions are alternately arranged to form a support structure configured to support the cover plate, and two sides of the cover plate are fixedly connected to the support structure;
wherein the first protrusion comprises a first surface, the second protrusion comprises a second surface, the first surface and the second surface both face the cover plate, and bottom surfaces of the two end areas, the first surface, and the second surface are flush;
wherein a length of the first protrusion is greater than a length of the second protrusion;
wherein the first protrusion and the second protrusion are alternately engaged, and the first protrusion and the middle frame are integrally formed and have same material; and
wherein the first sidewall is positioned lower than the second protrusion, and the display panel is fixedly connected to top surfaces of the first sidewall and the second sidewall by a black shading glue.

2. The mobile terminal according to claim 1, wherein the first surface, the second surface, and the bottom surfaces of the two end areas define a connecting surface, and a peripheral edge portion of the cover plate is fixedly connected to the connecting surface by a foam adhesive.

3. The mobile terminal according to claim 1, wherein a width of the first protrusion ranges between 0.4 mm and 0.5 mm.

4. The mobile terminal according to claim 1, wherein the first protrusions positioned between two first side surfaces are oppositely disposed, and the second protrusions positioned between two first sidewalls face away from each other.

5. The mobile terminal according to claim 1, wherein the fixing frame further comprises opposite second sidewalls, an extending direction of the second sidewall is parallel to an extending direction of the two end areas, the second sidewall is positioned equal to the first sidewall, and the first sidewall is positioned lower than the second protrusion.

6. The mobile terminal according to claim 5, wherein a portion of the second protrusion positioned higher than the first sidewall defines a first fixing slot, the first sidewall and the second sidewall are encircled to define a second fixing slot, the backlight module is disposed in the second fixing slot, and the display panel is disposed in the first fixing slot.

7. The mobile terminal according to claim 6, wherein the display panel is fixedly connected to top surfaces of the first sidewall and the second sidewall by a black adhesive.

8. The mobile terminal according to claim 1, wherein the cover plate and the display panel are fixedly connected by an optical adhesive.

9. A mobile terminal, comprising:
a middle frame comprising a first placement slot and a second placement slot, wherein the first placement slot comprises an intermediate area and two end areas positioned at two ends of the intermediate area, the second placement slot is positioned below the intermediate area and communicates with the intermediate area, a peripheral edge of the intermediate area and a peripheral edge of the second placement slot are coincident;
a display module disposed in the second placement slot; and
a cover plate disposed in the first placement slot;
wherein the display module comprises a fixing frame, a backlight module, and a display panel, and the backlight module and the display panel are both disposed in the fixing frame;
wherein the second placement slot comprises opposite first side surfaces, an extending direction of the first side surface is perpendicular to an extending direction of the two end areas, the first side surfaces are provided with a plurality of first protrusions, the first protrusions positioned on a same first side surface are spaced apart, a plurality of first grooves are defined between the first protrusions positioned on the same first side surface, the fixing frame comprises opposite first sidewalls, the first sidewalls facing a side of the first side surface are provided with a plurality of second protrusions, the second protrusions positioned on a same first sidewall are spaced apart, and a plurality of second grooves are defined between the second protrusions positioned on the same first sidewall;
wherein the first protrusions are disposed in the second grooves in a one-to-one correspondence, the second protrusions are disposed in the first grooves in a one-to-one correspondence, the first protrusions and the second protrusions are alternately arranged to form a support structure configured to support the cover plate, and two sides of the cover plate are fixedly connected to the support structure;
wherein the first protrusion and the second protrusion are alternately engaged, and the first protrusion and the middle frame are integrally formed and have same material; and
wherein the first sidewall is positioned lower than the second protrusion, and the display panel is fixedly connected to top surfaces of the first sidewall and the second sidewall by a black shading glue.

10. The mobile terminal according to claim 9, wherein the first protrusion comprises a first surface, the second protrusion comprises a second surface, the first surface and the second surface both face the cover plate, and bottom surfaces of the two end areas, the first surface, and the second surface are flush.

11. The mobile terminal according to claim 10, wherein the first surface, the second surface, and the bottom surfaces of the two end areas define a connecting surface, and a peripheral edge portion of the cover plate is fixedly connected to the connecting surface by a foam adhesive.

12. The mobile terminal according to claim 9, wherein a width of the first protrusion ranges between 0.4 mm and 0.5 mm.

13. The mobile terminal according to claim 9, wherein a length of the first protrusion is greater than a length of the second protrusion.

14. The mobile terminal according to claim 9, wherein the first protrusions positioned between two first side surfaces are oppositely disposed, and the second protrusions positioned between two first sidewalls face away from each other.

15. The mobile terminal according to claim 9, wherein the fixing frame further comprises opposite second sidewalls, an extending direction of the second sidewall is parallel to an extending direction of the two end areas, the second sidewall is positioned equal to the first sidewall, and the first sidewall is positioned lower than the second protrusion.

16. The mobile terminal according to claim 15, wherein a portion of the second protrusion positioned higher than the first sidewall defines a first fixing slot, the first sidewall and the second sidewall are encircled to define a second fixing slot, the backlight module is disposed in the second fixing slot, and the display panel is disposed in the first fixing slot.

17. The mobile terminal according to claim 16, wherein the display panel is fixedly connected to top surfaces of the first sidewall and the second sidewall by a black adhesive.

18. The mobile terminal according to claim 9, wherein the cover plate and the display panel are fixedly connected by an optical adhesive.

* * * * *